United States Patent Office 3,816,443
Patented June 11, 1974

3,816,443
4-(BENZOTHIAZOL-2-YL)FLUORO PHENYL-
ACETIC ACIDS
Conrad P. Dorn, Jr., Plainfield, N.J. assignor to
Merck & Co., Inc., Rahway, N.J.
No Drawing. Filed Feb. 17, 1972, Ser. No. 227,286
Int. Cl. C07d 91/44
U.S. Cl. 260—304 2 Claims

ABSTRACT OF THE DISCLOSURE 4-(benzothiazol-2-yl)phenylacetic acids, esters, amides and the nontoxic pharmaceutically acceptable salts thereof and processes for their preparation are described. The substituted 4-(benzothiazol-2-yl)phenylacetic acids are useful as anti-inflammatory compounds. In general they are prepared by condensing an o-aminothiophenol with a benzoic acid carrying a para substituent convertible to an acetic acid residue by conventional techniques.

---

This invention relates to a novel class of compounds. In addition it relates to a class of compounds useful in the treatment of inflammation, which also exhibit potent analgesic and antipyretic activity. More particularly, this invention relates to 4-(benzothiazol-2-yl)phenylacetic acids, alcohols, esters and amides, and nontoxic pharmaceutically-acceptable salts thereof, and processes for their production.

This invention also includes methods of treating inflammation in its varying manifestations, utilizing novel anti-inflammatory compositions containing benzothiazole phenylacetic acids. In addition, these novel compositions exhibit potent analgesic and antipyretic activity and, therefore, this invention also relates to analgesic and antipyretic methods and compositions. Furthermore, this invention is concerned with analgesic and antipyretic methods for the relief and treatment of pain and fever not symptomatically related to an inflammatory indication and compositions utilized therefore.

The novel benzothiazole phenylacetic acids employed in the treatment of a condition symptomatically evidenced by pain, fever and inflammation, either as an essential or concommitant phenomena of the condition are represented by

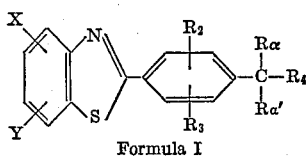

Formula I wherein $R_a'$ is hydrogen or lower alkyl of 1–5 carbon atoms;
$R_a$ is hydrogen;
$R_a'$ and $R_a$ when taken together is lower alkylidene;
$R_2$ is
 hydrogen,
 halo, such as chloro and fluoro,
 hydroxy,
 lower alkoxy of 1 to 5 carbon atoms,
 mercapto,
 loweralkylthio of 1 to 5 carbon atoms,
 lower alkylsulfinyl of 1 to 5 carbon atoms,
 lower alkyl sulfonyl of 1 to 5 carbon atoms,
 nitro,
 amino,
 di(loweralkyl)amino, wherein the lower alkyl groups are the same or different and are of 1 to 5 carbon atoms,
 lower alkanoylamino, wherein the lower alkanoyl group is of 1 to 5 carbons,
 sulfamoyl, or
 sulfo;
$R_3$ is
 hydrogen,
 halo, such as chloro and fluoro,
 lower alkoxy of 1 to 5 carbon atoms,
 nitro,
 hydroxy, or
 amino;
X is
 hydrogen,
 halo, such as chloro and fluoro,
 di(lower alkyl)amino, wherein the lower alkyl groups can be the same or different and are each of 1 to 5 carbon atoms,
 lower alkoxy of 1 to 5 carbon atoms,
 lower alkylthio of 1 to 5 carbon atoms;
 lower alkylsulfinyl of 1 to 5 carbon atoms,
 lower alkyl sulfonyl of 1 to 5 carbon atoms,
 nitro,
 amino, or
 lower alkyl of 1 to 5 carbon atoms;
Y is
 hydrogen,
 halo, such chloro and fluoro,
 di(lower alkyl)amino, wherein the loweralkyl groups can be the same or different and are each of 1 to 5 carbon atoms,
 lower alkylamino of 1 to 5 carbon atoms, or
 lower alkoxy of 1 to 5 carbon atoms,
$R_4$ is
 —COOH,
 —CH$_2$—OH,
 —COOR, where R may be
  lower alkyl of 1 to 5 carbon atoms,
  lower alkenyl of 3 to 5 carbon atoms,
  lower cycloalkyl of 3 to 7 carbons,
  phenyl,
  phenyl lower alkyl, wherein the lower alkyl is of 1 to 5 carbons, such as benzyl,
  lower alkoxy-lower alkyl, each lower radical being of 1 to 5 carbon atoms,
  hydroxy lower alkyl of 1 to 5 carbon atoms, or
  di(lower alkyl)amino lower alkyl, each lower radical being of 1 to 5 carbon atoms;

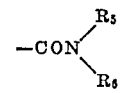

where $R_5$ is
 hydrogen,
 lower alkyl of 1 to 5 carbons,
 phenyl lower alkyl where the alkyl group is of 1 to 5 carbons,
 phenyl, or
 lower cycloalkyl of 3 to 7 carbons; and
 $R_6$ is hydrogen, or lower alkyl of 1 to 5 carbons;
and the pharmaceutically acceptable nontoxic salts thereof.
In the more preferred aspects of this invention, X, Y, $R_a'$ and $R_a$ are as defined, $R_2$ and $R_3$ are the same or different and each is hydrogen or halogen such as fluoro or chloro, and $R_4$ is —COOH.
In the still more preferred aspects, X is hydrogen, halo, such as fluoro or chloro, lower alkoxy, or lower alkyl; Y is hydrogen, halo, such as fluoro or chloro, or lower alkoxy; $R_a'$ is hydrogen or methyl; $R_a$ is hydrogen; $R_2$ and $R_3$ are the same or different and each is hydrogen or halo such as chloro or fluoro; and $R_4$ —COOH.

In the still more preferred aspects of this invention
X and Y are hydrogen,
$R_a'$ is hydrogen or methyl,
$R_a$ is hydrogen,
$R_2$ and $R_3$ are the same or different and each is hydrogen or halogen, such as fluoro and chloro, and
$R_4$ is —COOH.

Specific members of this class which are highly effective anti-inflammatory agents include:

4-(benzothiazol-2-yl)-2-fluorophenylaectic acid,
4-(benzothiazol-2-yl)phenylacetic acid,
2-[4-(benzothiazol-2-yl)phenyl]propionic acid.

With regard to the last compound, in addition to the racemate and levo isomer, of interest is the "d" (dextro) isomer; (d)-2-[4-(benzoxazol - 2 - yl)phenyl]propionic acid.

It should be noted that in addition to the free acids, encompassed within the scope of the preferred aspects of the invention are the corresponding alcohols, esters, amides and pharmaceutically acceptable addition salts.

The term "pharmaceutically acceptable addition salts" signifies those salts derived from pharmacologically acceptable inorganic and organic bases. Suitable salts include those of alkali metals such as sodium, potassium or lithium, those of alkaline earth metals such as magnesium and calcium, ammonium and salts of organic amines such as ethylamine, triethylamine, ethanolamine, diethanolamine, diethylaminoethanol, ethylenediamine, benzylamine, procaine, pyrrolidine, piperidine, morpholine, 1-ethyl-piperidine, 2-piperidino ethanol and the like.

The benzothiazoles of the invention possess a high degree of anti-inflammatory, analgesic and antipyretic activity. They are of value in the treatment of arthritic and dermatological disorders or like conditions responsive to anti-inflammatory drugs. In general they are indicated for a wide variety of conditions where one or more of the symptoms of inflammation, fever and pain are manifested. Included within this category are diseases such as rheumatoid arthritis, osteoarthritis, gout, infectious arthritis, rheumatic fever and inflammatory conditions of the ocular system. As indicated above the compounds utilized in the practice of the invention also possess a useful degree of analgesic and antipyretic activity.

For these purposes the compounds of the invention may be administered orally, topically, parenterally, by inhalation spray or rectally in dosage unit formulations containing conventional nontoxic pharmaceutically acceptable carriers, adjuvants and vehicles. The term parenteral, as used herein, includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with nontoxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate may be employed.

Formulations for oral use may also be presented as hard gelatine capsules wherein the active ingredient is mixed with an inert solid diluent, for example, calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxyethanol, or condensation products of ethylene oxide with partial esters derived from fatty acids and a hexitol such as polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example ethyl, or n-propyl, p-hydroxy benzoate, one or more coloring agents, one or more flavoring agents, and one or more sweetening agents, such as sucrose or saccharin.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oil, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous or oleaginous suspension. This suspension may be formulated according to the known art using those suitable dispersing or wetting agents and suspending agents which have been mentioned above. The sterile injectable preparation may also be a sterile injectable solution or suspension in a nontoxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

The compounds of the invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jellies, solutions or suspensions etc. containing the anti-inflammatory agents are employed.

Dosage levels of the order of .5 mg. to 140 mg. per kilogram of body weight per day are useful in the treatment of the above indicated conditions (25 mg.–7 gm. per patient per day). For example, inflammation is effectively treated and antipyretic and analgesic activity manifested by the administration from about .1 to 50 mg. of the compound per kilogram of body weight per day (5 mg. to 3.5 gms. per patient per day). Advantageously, from about 1 mg. to about 15 mg. per kilogram of body weight per daily dosage produces highly effective results (50 mgs. to 1 gm. per patient per day).

The amount of active ingredient that may be combined with the carrier material to produce a single dosage form will vary depending upon the host treated and the particular mode of administration. For example a formulation intended for the oral administration of humans may contain from 5 mg. of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

Most of the novel compounds of this invention may be prepared as shown by the following schematic:

REACTION SCHEME I

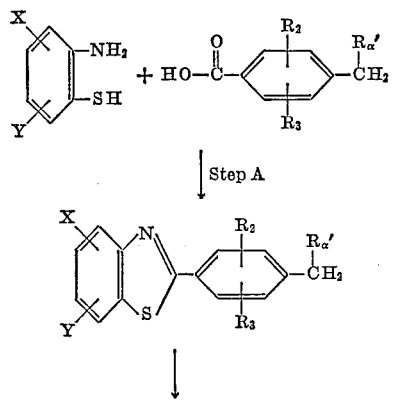

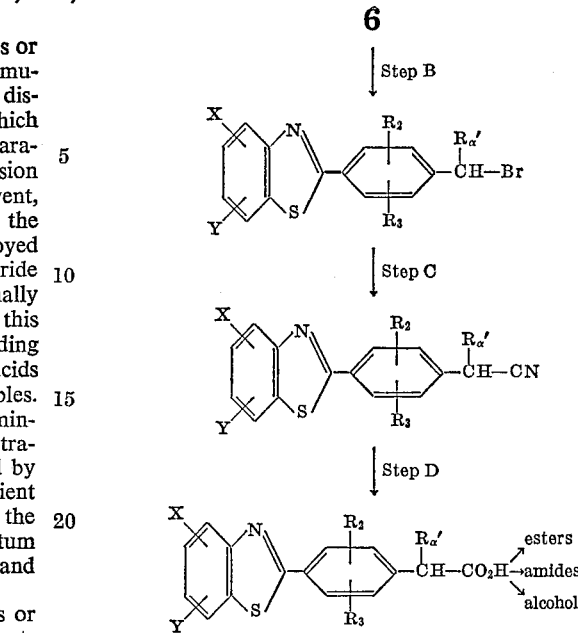

where X, Y, $R_2$, $R_3$ and $R_a'$ are as previously defined.

Following is a particular description of each of the steps above:

Step A.—Reaction of an appropriate o-aminothiophenol with an appropriate benzoic acid in polyphosphoric ester and an inert organic solvent such as chloroform, toluene, benzene or the like, at moderate temperature for 1–3 hours or in polyphosphoric acid at elevated temperatures (about 250° C.) to yield the corresponding alkylphenylbenzothiazole.

Step B.—Treatment of the alkylphenyl benzothiazole formed in Step A with N-bromosuccinimide in refluxing carbon tetrachloride preferably in the presence of a catalytic amount of dibenzoyl peroxide to give the corresponding bromoalkylphenyl benzothiazole.

Step C.—Treatment of the bromoalkylphenyl benzothiazole formed in Step B with sodium cyanide in DMSO at 60–70° C. for 1–3 hours to give the corresponding cyanoalkylphenyl benzothiazole.

Step D.—Acid hydrolysis of the cyanoalkylphenyl benzothiazole formed in Step C by heating for about 1 hour at 85–95° C. in concentrated hydrochloric acid to give the desired benzothiazole phenyl acetic acid.

Compounds of Formula I are most readily prepared by starting with a preformed phenylacetonitrile if available as follows:

The reaction conditions for the step shown are identical with that described for previous Step A. Conversion of the nitrile to the product of Formula I proceeds exactly as described in previous Step D.

Compounds which have an alkylidene linkage, particularly a methylene linkage, at the α-position of the acid side chain can be prepared according to the following process.

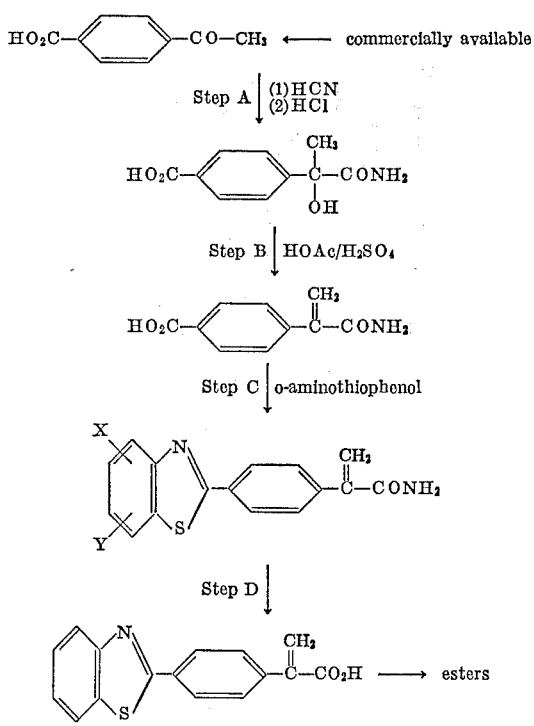

The nontoxic pharmaceutically acceptable salts of the acid can be prepared from the acid by any of the well-known metathesis procedures. For example, the acid can be reacted with an inorganic base such as sodium hydroxide, potassium hydroxide, ammonium hydroxide, barium hydroxide, and the like.

The compounds of this invention, wherein $R_4$ is a group such that an ester is the final compound (i.e. $R_4$=alkoxycarbonyl), are prepared by any esterification procedure using an esterifying agent containing the appropriate $R_4$ group. For example, the acetic acid compounds of this invention may be reacted with the appropriate lower alkanol (preferably methanol) in the presence of a strong acid, such as hydrochloric acid, sulfuric acid, p-toluenesulfonic acid, and the like, to form the desired $R_4$ compound. The methyl ester ($R_4$=methoxycarbonyl) can also be prepared by the treatment of the acid with diazomethane.

The compounds of this invention, wherein $R_4$ is a group such that an amide is the final compound (i.e. $R_4$ is aminocarbonyl), may be prepared by any suitable amidation reaction. For example, the acetic acid compound (preferably the methyl or ethyl ester or acid halide) may be reacted with ammonia, ammonium hydroxide, or an amine compound, at any suitable temperature (room temperature to reflux). When the unsubstituted amine is desired, it is preferred to prepare it through partial hydrolysis of the intermediate acetonitriles by conventional means.

The alcohols may be formed from the corresponding acids using reductive techniques well known to the art. Members of this class include:

4-(benzothiazol-2-yl)-2-fluorophenylethanol,
2-[4-benzothiazol-2-yl-phenyl]propanol.

The following examples are used by way of illustration and should not be construed as limitations of the application.

EXAMPLE 1

2-[4-(benzothiazol-2-yl)phenyl]acetic acid

Step A: Preparation of 2-[4-benzothiazol-2-yl)phenyl]acetonitrile.—To a mixture of 1.0 gm. of o-aminothiophenol, 10 gm. of polyphosphate ester and 30 cc. of chloroform is added 1.5 gm. of p-cyanomethylbenzoic acid. The reaction mixture is refluxed for 45 minutes during which time solution occurs. The mixture is then concentrated in vacuo and ice water added. Neutralization with sodium bicarbonate is carried out followed by extraction with methylene chloride. The combined methylene chloride extracts are dried and concentrated to give crude product. Recrystallization from methanol gives 0.65 gm. of 2-[4-(benzothiazol-2-yl)phenyl]acetonitrile, M.P. 157–159° C.

Step B: Preparation of 2-[4-(benzothiazol-2-yl)phenyl]acetic acid.—A mixture of 0.6 gm. of 2-[4-benzothiazol-2-yl)phenyl]acetonitrile and 25 cc. of concentrated hydrochloric acid is heated on the steam bath for 1 hour during which time a clear solution gradually forms. Upon cooling, a precipitate forms which is collected by filtration. The precipitate is washed with water, air dried and recrystallized from methanol to give 0.49 gm. of 2-[4-benzothiazol-2-yl)phenyl]acetic acid, M.P. 181–184° C.

EXAMPLE 2

2-[4-(benzothiazol-2-yl)-phenyl]propionic acid

Step A: Preparation of 2-(4-ethylphenyl)benzothiazole.—A mixture of 9.0 gm. of 4-ethylbenzoic acid, 7.5 gm. of o-aminothiophenol and 125 cc. of polyphosphoric acid is heated at 250° C. for 4 hours. At the end of this time the reaction mixture is cooled to about 100° C. and poured into ice-water. The resulting mixture is extracted well with methylene chloride. The combined methylene chloride extracts are washed with water, dried and concentrated to yield crude product. Chromatography on 500 gm. of silica gel and elution with methylene chloride gives 4.5 gm. of 2-(4-ethylphenyl)benzothiazole.

Step B: Preparation of 2-[4-(1-bromoethyl)phenyl]benzothiazole.—A mixture of 4.4 gm. of 2-(4-ethylphenyl)benzothiazole and 3.5 gm. of N-bromosuccinimide in 200 cc. of carbon tetrachloride is refluxed for one-half hour. The reaction mixture is then filtered to remove succinimide and the filtrate concentrated to yield crude product. Chromatography on silica gel and elution with methylene chloride gives 4.4 gm. of pure 2-[4-(1-bromoethyl)phenyl]benzothiazole.

Step C: Preparation of 2-[4-benzothiazol-2-yl)phenyl]propionitrile.—A mixture of 4.4 gm. 2-[4-(1-bromoethyl)phenyl]benzothiazole in 45 cc. of dimethylsulfoxide is cooled in an ice bath and 3.0 gm. of powdered sodium cyanide is added. After ten minutes the ice bath is removed and the reaction mixture is allowed to warm to room temperature. After 4 hours the reaction mixture is poured into a mixture of benzene ether and diluted hydrochloric acid. The organic layer is separated, washed well with water, dried and concentrated. Chromatography of the residue on 500 gm. of silica gel and elution with methylene chloride gives 2.4 gm. of 2-[4-(benzothiazol-2-yl)phenyl]propionitrile.

Step D: Preparation of 2-[4-(benzothiazol-2-yl)phenyl]propionic acid.—A mixture of 2.4 gm. of 2-[4-(benzothiazol-2-yl)phenyl]propionitrile and 75 cc. of concentrated hydrochloric acid is heated on the steam bath for one hour. The reaction mixture is filtered into ice water and the resulting precipitate is separated by filtration, washed with water and then with 25 cc. of ice cold methanol to give 1.4 gm. of 2-[4-(benzothiazol-2-yl)phenyl]propionic acid, M.P. 178–181° C.

EXAMPLE 3

2-[4-benzothiazol-2-yl)-2-fluorophenyl]acetic acid

Step A: Preparation of 2-(3-fluoro-4-methylphenyl)benzothiazole.—A mixture of 10 gm. 3-fluoro-4-toluic acid, 9.0 gm. of o-aminothiophenol and 125 cc. of polyphosphoric acid is heated for 4 hours at 250° C. with mechanical stirring. The reaction mixture is cooled to about 100° C. and poured into ice water. The resulting mixture is extracted well with methylene chloride. The combined methylene chloride extracts are washed well with water, dried and concentrated. Recrystallization from methanol gives 12.2 gm. of 2-(3-fluoro-4-methylphenyl) benzothiazole, M.P. 97–99° C.

Step B: Preparation of 2-(4-bromomethyl-3-fluorophenyl)benzothiazole.—A mixture of 12.2 gm. of 2-(3-fluoro-4-methylphenyl)benzothiazole and 10.5 gm. of N-bromosuccinimide is refluxed for 5 hours in 400 cc. of carbontetrachloride. Several portions of benzoyl peroxide (ca. 50 mg.) were added during the course of the reaction. After reaction was complete the mixture is filtered to remove succinimide. The filtrate is concentrated, petroleum ether added and 21.2 gm. of 2-(4-bromomethyl-3-fluorophenyl)benzothiazole collected by filtration.

Step C: Preparation of 2-[4-(benzothiazol-2-yl)-2-fluorophenyl]acetonitrile.—A mixture of 18 gm. of 2-(4-bromomethyl-3-fluorophenyl)benzothiazole and 30 gm. of sodium cyanide in 900 cc. of methanol is refluxed for thirty minutes and then poured into acidified ice water. The precipitate is collected and air dried to give 11.4 gm. of crude material. Chromatography on 600 gm. of silica gel and elution with methylene chloride gives 4.9 gm. of pure product and 3.0 gm. of slightly impure material.

Step D: Preparation of methyl 2-[4-(benzothiazol-2-yl)-2-fluorophenyl]acetate.—A mixture of 4.8 gm. of 2-[4 - (benzothiazol-2-yl)-2-fluorophenyl]acetonitrile and 200 mls. of concentrated hydrochloric acid is heated for thirty minutes on the steam bath. During this time solution of the starting material gradually occurs followed by the formation of a precipitate. After one half hour the mixture is cooled in an ice bath and the yellow precipitate collected by filtration. The yield is 5 gm. of crude material which melts over a range finally decomposing at 195° C. Recrystallization frol methanol gives light yellow crystals melting at 98–100° C. Analysis and NMR indicate the product to be methyl 2-[4-(benzothiazol-2-yl)-2-fluorophenyl]acetate.

Step E: Preparation of 2-[4-(benzothiazol-2-yl)-2-fluorophenyl]acetic acid.—A mixture of 1.5 gm. of methyl 2 - [4 - (benzothiazol-2-yl)-2-fluorophenyl)acetate and 0.5 gm. of sodium hydroxide in 400 cc. methanol and 50 cc. of water is stirred for one half hour with slight heating to effect solution. The reaction mixture is then concentrated *in vacuo* and dissolved in 125 cc. of water and filtered. The filtrate is acidified with acetic acid and the resulting precipitate collected by filtration and air dried. Recrystallization from toluene gives 0.89 gm. of 2-[4-(benzothiazol-2-yl)-2-fluorophenyl)acetic acid, M.P. 175–178° C.

Employing the procedure of Example 3, Steps A through E, but substituting for the o-aminothiophenol and 3-fluoro-4-toluic acid employed in Step A, equivalent amounts of the o-aminothiophenols and toluic acids identified in Table I, there are produced the corresponding 4-(benzothiazol-2-yl)phenylacetic acids also identified in Table I, in accordance with Reaction Scheme I previously described.

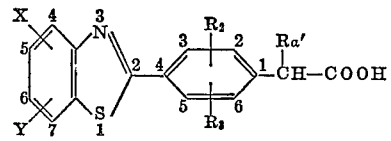

TABLE I

| Example | X | Y | R₂ | R₃ | Ra' |
|---|---|---|---|---|---|
| 4 | 5-Cl | H | H | H | H |
| 5 | 6-Cl | H | H | H | CH₃— |
| 6 | 7-Cl | H | H | H | CH₃— |
| 7 | 6-(CH₃)₂N— | H | H | H | H |
| 8 | 5-CH₃O— | H | H | H | H |
| 9 | 6-CH₃O— | H | H | H | CH₃— |
| 10 | 5-CH₃S— | H | H | H | H |
| 11 | 5-O₂N— | H | H | H | CH₃— |
| 12 | 6-O₂N— | H | H | H | H |
| 13 | 5-Cl | 6-Cl | H | H | H |
| 14 | 5-C₃H₇— | H | H | H | CH₃— |
| 15 | 5-(CH₃)₂N— | 6-(CH₃)₂N— | H | H | CH₃— |
| 16 | 5-Cl | 6-(CH₃)₂N— | H | H | CH₃— |
| 17 | 4-CH₃O— | 6-Cl— | H | H | CH₃— |
| 18 | 4-Cl— | 6-Cl— | H | H | H |
| 19 | 5-CH₃O— | 6-(CH₃)₂N— | H | H | H |
| 20 | 6-C₂H₅O | H | H | H | H |
| 21 | 5-CH₃O— | 6-CH₃NH— | H | H | H |
| 22 | 4-O₂N— | 6-CH₃O— | H | H | H |
| 23 | 5-Cl— | 7-Cl— | H | H | H |
| 24 | 5-CH₃O— | 6-CH₃O— | H | H | H |
| 25 | 5-Cl | H | 2-F— | H | H |
| 26 | 6-Cl | H | 2-F— | H | H |
| 27 | 7-Cl | H | 2-F— | H | H |
| 28 | 6-(CH₃)₂N— | H | 2-F— | H | H |
| 29 | 5-CH₃O— | H | 2-F— | H | H |
| 30 | 6-CH₃O— | H | 2-F— | H | H |
| 31 | 5-CH₃S— | H | 2-F— | H | H |
| 32 | 5-O₂N— | H | 2-F— | H | H |
| 33 | 6-O₂N— | H | 2-F— | H | H |
| 34 | 5-Cl | 6-Cl | 2-F— | H | H |
| 35 | 5-C₃H₇— | H | 2-F— | H | H |
| 36 | 5-(CH₃)₂N— | 6-(CH₃)₂N— | 2-F— | H | H |
| 37 | 5-Cl | 6-(CH₃)₂N— | 2-F— | H | H |
| 38 | 4-CH₃O— | 6-Cl— | 2-F— | H | H |
| 39 | 4-Cl— | 6-Cl— | 2-F— | H | H |
| 40 | 5-CH₃O— | 6-(CH₃)₂N— | 2-F— | H | H |
| 41 | 6-C₂H₅O— | H | 2-F— | H | H |
| 42 | 5-CH₃O— | 6-CH₃NH— | 2-F— | H | H |
| 43 | 4-O₂N— | 6-CH₃O— | 2-F— | H | H |
| 44 | 5-Cl— | 7-Cl— | 2-F— | H | H |
| 45 | 5-CH₃O— | 6-CH₃O— | 2-F— | H | H |
| 46 | 5-Cl | H | 3-F— | H | H |
| 47 | 6-Cl | H | 3-F— | H | H |
| 48 | 7-Cl | H | 3-F— | H | H |
| 49 | 6-(CH₃)₂N— | H | 3-F— | H | H |
| 50 | 5-CH₃O— | H | 3-F— | H | H |
| 51 | 6-CH₃O— | H | 3-F— | H | H |

TABLE I—Continued

| Example | X | Y | R₂ | R₃ | Rₐ' |
|---|---|---|---|---|---|
| 52 | 5-CH₃S— | H | 3-F— | H | H |
| 53 | 5-O₂N— | H | 3-F— | H | H |
| 54 | 6-O₂N— | H | 3-F— | H | H |
| 55 | 5-Cl | 6-Cl | 3-F— | H | H |
| 56 | 5-C₃H₇— | H | 3-F— | H | H |
| 57 | 5-(CH₃)₂N— | 6-(CH₃)₂N— | 3-F— | H | H |
| 58 | 5-Cl | 6-(CH₃)₂N— | 3-F— | H | H |
| 59 | 4-CH₃O— | 6-Cl— | 3-F— | H | H |
| 60 | 4-Cl— | 6-Cl— | 3-F— | H | H |
| 61 | 5-CH₃O— | 6-(CH₃)₂N— | 3-F— | H | H |
| 62 | 6-C₂H₅O— | H | 3-F— | H | H |
| 63 | 5-CH₃O— | 6-CH₃NH— | 3-F— | H | H |
| 64 | 4-O₂N— | 6-CH₃O— | 3-F— | H | H |
| 65 | 5-Cl— | 7-Cl— | 3-F— | H | H |
| 66 | 5-CH₃O— | 6-CH₃O— | 3-F— | H | H |
| 67 | H | H | 3-F— | H | H |
| 68 | H | H | 3-NH₂— | H | H |
| 69 | 5-Cl | H | 2-NH₂— | H | H |
| 70 | 6-Cl | H | 3-Cl | H | H |
| 71 | 7-Cl | H | 2-Cl | H | H |
| 72 | 6-(CH₃)₂N— | H | 2-(CH₃)₂N— | H | H |
| 73 | 5-CH₃O— | H | 3-HS— | H | H |
| 74 | 6-CH₃O— | H | 3-CH₃O— | H | H |
| 75 | 5-CH₃S— | H | 2-CH₃O— | H | H |
| 76 | 5-O₂N— | H | 2-CH₃S— | H | H |
| 77 | 6-O₂N— | H | 3-O₂N— | H | H |
| 78 | 5-Cl | 6-Cl | 2-O₂N— | H | H |
| 79 | 5-C₃H₇— | H | 3-Cl— | 6-Cl— | H |
| 80 | 5-(CH₃)₂N— | 6-(CH₃)₂N— | 2-Cl— | 6-Cl— | H |
| 81 | 5-Cl | 6-(CH₃)₂N— | 3-CH₃O— | 5-CH₃O— | H |
| 82 | 4-CH₃O— | 6-Cl— | 3-CH₃O— | 6-CH₃O— | H |
| 83 | 4-Cl— | 6-Cl— | 2-CH₃O— | 6-CH₃O— | H |
| 84 | 5-CH₃O— | 6-(CH₃)₂N— | 2-O₂N— | 6-O₂N— | H |
| 85 | 6-C₂H₅O— | H | 2-O₂N— | 3-O₂N— | H |
| 86 | 5-CH₃O— | 6-CH₃NH— | 3-O₂N— | 5-O₂N— | H |
| 87 | 4-O₂N— | 6-CH₃O— | 2-O₂N— | 6-O₂N— | H |
| 88 | 5-Cl— | 7-Cl— | 3-HO— | 5-HO— | H |
| 89 | 5-CH₃O— | 6-CH₃O— | 3-HO— | 6-HO— | H |
| 90 | H | H | 3-H₂N— | 6-H₂N— | H |
| 91 | H | H | 2-H₂N— | 6-H₂N— | H |
| 92 | H | H | 2-C₂H₅O— | 3-O₂N— | H |
| 93 | H | H | 2-H₂N— | 6-F— | H |
| 94 | H | H | 2-F— | 6-O₂N— | H |
| 95 | H | H | 2-CH₃O— | 3-O₂N— | H |
| 96 | H | H | 3-C₂H₅O— | 6-Cl— | H |
| 97 | H | H | 3-CH₃O— | 6-Cl— | H |
| 98 | H | H | 2-H₂NSO₂— | H | H |
| 99 | H | H | 3-H₂NSO₂— | H | H |
| 100 | H | H | 2-HO₃S— | H | H |
| 101 | H | H | 3-HO₃S— | H | H |
| 102 | H | H | 2-CH₃CONH— | H | H |
| 103 | H | H | 3-CH₃CONH— | H | H |
| 104 | H | H | 3-C₂H₅O— | H | H |
| 105 | H | H | 2-CH₃S— | H | H |

EXAMPLE 106

Methyl 4-(benzothiazol-2-yl)-2-fluorophenyl acetate

To a solution of diazomethane in 75 ml. of ether is added portionwise, as a solid, 1.0 gm. of 4-(benzothiazol-2-yl)-2-fluorophenyl acetic acid. Nitrogen is evolved and after 1 hour the excess diazomethane is consumed by adding acetic acid. The reaction mixture is filtered and the filtrate is concentrated to a solid. Recrystallization from methanol gives methyl 4-(benzothiazol-2-yl)-2-fluorophenyl acetate, M.P. 98–100° C.

Methyl esters and others may also be prepared using techniques well known to the art, for example treating the carboxylic acid with an alcohol, in the presence of an acid, or conversion of the carboxylic acid to an acid halide, usually the chloride, and reaction of the acid halide wtih an alcohol. Representative examples of such esters are:

ethyl 4-(benzothiazol-2-yl)-2-fluorophenylacetate;
allyl 4-(benzothiazol-2-yl)-2-fluorophenylacetate;
cyclopropyl 4-(benzothiazol-2-yl)-phenylacetate;
phenyl 2[4-(benzothiazol-2-yl)phenyl]propionate;
hydroxyethyl 4-(benzothiazol-2-yl)-2-fluorophenylacetate;
diethylaminoethyl 4-(benzothiazol-2-yl)-2-fluorophenylacetate;
benzyl 4-(benzothiazol-2-yl)-2-fluorophenylacetate.

EXAMPLE 107

4-(benzothiazol-2-yl)phenylacetamide

A solution of 0.1 gm. of 4-(benzothiazol-2-yl)-phenylacetonitrile (from Example 1, Step A) in 2 ml. of concentrated hydrochloric acid is allowed to stand at room temperature overnight. The reaction mixture is then filtered through a sintered glass filter into 50 ml. of cold water. The resulting precipitate is collected and air dried to give 4-(benzothiazol-2-yl)phenylacetamide.

The amide of any of the other carboxylic acids of this invention can be similarly prepared from the intermediate acetonitriles.

Substituted amides may be conveniently prepared using conventional techniques well known to the art. For example, the carboxylic acids are converted to the acid halide, usually the chloride, and subsequently treated with the appropriate amine. Representative examples include the following:

N-methyl-4-(benzothiazol-2-yl)phenylacetamide;
N-phenyl-4-(benzothiazol-2-yl)-2-fluorophenylacetamide;
N-phenylmethyl-2-[4-benzothiazol-2-yl)phenyl]propionamide;
N,N-dimethyl-4-(benzothiazol-2-yl)-phenylacetamide;
N-cyclohexyl-4-(benzothiazol-2-yl)-2-fluorophenylacetamide.

EXAMPLE 108

4-benzothiazol-2-ylatropic acid

Step A: Preparation of 4-carboxy-α-hydroxyhydratropamide.—0.1 moles of p-acetylbenzoic acid and 30 ml. of liquid hydrogen cyanide are stirred at 0° C. for 5 minutes. There is then added 5 ml. of piperidine and the resulting mixture stirred at 0° C. for 1½ hours. The mixture is then poured into 250 ml. of concentrated hydrochloric acid (previously cooled to 0° C.), saturated with hydrogen chloride gas, stirred cold 1 hour, and then at room temperature over night. Extraction with chloroform, washing the chloroform extracts with water, drying and concentrating in vacuo, gives p-carboxy-α-hydroxyhydratropamide.

Step B: Preparation of 4-carboxyatropamide.—To a solution of 0.05 moles of p-carboxy-α-hydroxyhydratropamide in 50 cc. of acetic acid is added 5 cc. of concentrated sulfuric acid. The mixture is heated on the steam bath for ½ hour, then concentrated in vacuo. Addition of water to the residue and filtration gives p-carboxyatropamide.

Step C: Preparation of 4-benzothiazol - 2 - ylatropamide.—Employing the procedure of Example 1, Step A, but substituting for the p-cyanomethylbenzoic acid used therein, an equivalent amount of 4-carboxyatropamide there is produced 4-benzothiazol-2-ylatropamide.

Step D: Preparation of 4-benzothiazol - 2 - ylatropic acid.—A mixture of 0.01 mole of 4-benzothiazol-2-ylatropamide, 15 ml. of acetic acid and 15 ml. of concentrated hydrochloric acid is heated on the steam bath for 1 hour. Filtration of the reaction mixture into 200 ml. of cold water, followed by filtration of the resulting precipitate, gives 4-benzothiazol-2-ylatropic acid.

EXAMPLE 109

4-(5-methylsulfinylbenzothiazol-2-yl)phenylacetic acid

To a solution of 3.15 g. (0.01 mole) of 4-(5-methylthiobenzothiazol-2-yl)phenyl acetic acid (from Example 10) in 25 ml. of glacial acetic acid is added 1.2 ml. (0.01 mole) of 30% hydrogen peroxide. The mixture is allowed to stand at ambient temperature overnight. The solution is concentrated to dryness and the residue is crystallized from methanol to give 4-(5-methylsulfinylbenzothiazol-2-yl)-phenyl acetic acid.

EXAMPLE 110

4-(5-methylsulfonylbenzothiazole-2-yl)phenylacetic acid

Using the procedure described in Example 109 but employing 0.02 mole of hydrogen peroxide and warming the mixture at reflux for 1-2 hours after standing overnight, there is produced 4-(5-methylsulfonylbenzothiazol-2-yl)phenyl acetic acid.

EXAMPLE 111

4-(benzothiazol-2-yl)-2-methylsulfinylphenylacetic acid

To a solution of 3.15 g. (0.01 mole) of 4-(benzothiazol-2-yl)-2-methylthiophenylacetic acid from Example 105 in 25 ml. of glacial acetic acid is added 1.2 ml. (0.01 mole) of 30% hydrogen peroxide. The mixture is allowed to stand overnight at ambient temperature. The solution is concentrated to dryness and the residue is crystallized from methanol to give 4-(benzothiazol-2-yl)-2-methylsulfinylacetic acid.

EXAMPLE 112

4-(benzothiazol-2-yl)-2-methylsulfonylphenylacetic acid

Using the procedure described in Example 111 but employing 0.02 mole of hydrogen peroxide and warming at reflux for 1-2 hours after standing overnight, there is produced 4-(5-benzothiazol-2-yl)-2-methylsulfonylphenylacetic acid.

EXAMPLE 113

4-(6-aminobenzothiazol-2-yl)-3-fluorophenylacetic acid

A solution of 3.14 g. (0.01 mole) of 4-(6-nitrobenzothiazol-2-yl)-3-fluorophenylacetic acid (from Example 54) in 100 ml. of ethanol is reacted with hydrogen at room temperature and about 40 p.s.i. in the presence of 10% palladium-on-carbon catalyst until the theoretical quantity of hydrogen is consumed. The catalyst is removed by filtration and the filtrate is concentrated to dryness. The residue is crystallized from methanol to give 4-(6-aminobenzothiazol-2-yl)-3-fluorophenylacetic acid.

The following are illustrative of the techniques that may be employed in the preparation of pharmaceutical formulations to be utilized in the practice of the invention.

EXAMPLE 114

A mixture of 250 parts of 4-(benzothiazol-2-yl)-2-fluorophenylacetic acid and 25 parts of lactose is granulated with suitable water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The specific benzothiazole used in the foregoing example may be replaced by 25, 100, 250, or 500 parts of other benzothiazoles of this invention to produce tablets suitable for oral administration as an anti-inflammatory, antipyretic and/or analgesic according to the method of this invention.

EXAMPLE 115

A mixture of 50 parts of 4-(benzothiazol-2-yl)-2-fluorophenylacetic acid, 3 parts of the calcium salt of lignin sulphonic acid, and 237 parts of water is ball-milled until the size of substantially all of the particles of the acid is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 116

A mixture of 250 parts of 2-[4-(benzoxazol-2-yl)phenyl]propionic acid, 200 parts of maize starch and 30 parts of alginic acid is mixed with a sufficient quantity of 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 117

A mixture of 500 parts 4-(benzothiazol-2-yl)-phenylacetic acid, 60 parts maize starch and 20 parts of gum acacia is granulated with a sufficient quantity of water. The mass is passed through a 12-inch screen and the granules are dried in a current of warm air. The dry granules are passed through a 16-mesh screen, mixed with 5 parts of magnesium stearate and compressed into tablet form suitable for oral administration.

EXAMPLE 118

(1) Tablets.—10,000 scored tablets for oral use, each containing 500 mg. of active ingredient are prepared from the following ingredients:

| | Gm. |
|---|---|
| 4-(benzothiazol-2-yl)-2-fluorophenyl acetic acid | 5000 |
| Starch, U.S.P. | 350 |
| Talc, U.S.P. | 250 |
| Calcium stearate | 35 |

The powdered phenylacetic acid is granulated with a 4% w./v. aqueous solution of methylcellulose U.S.P. (1500 cps.). To the dried granules is added a mixture of the remainder of the ingredients and the final mixture compressed into tablets of proper weight.

(2) Capsules.—10,000 two-piece hard gelatine capsules for oral use, each containing 250 mg. of benzothiazole are prepared from the following ingredients:

|  | Gm. |
|---|---|
| 2[4-(benzothiazol-2-yl)phenyl]-propionic acid | 2500 |
| Lactose, U.S.P. | 1000 |
| Starch, U.S.P. | 300 |
| Talc, U.S.P. | 65 |
| Calcium stearate | 25 |

The powdered benzothiazole is mixed with the starch-lactose mixture followed by the talc and calcium stearate. The final mixture is then encapsulated in the usual manner. Capsules containing 10, 25, 50, and 100 mg. of benzothiazol are also prepared by substituting 100, 250, 500 and 1000 gm. for 2500 gm. in the above formulation.

(3) Soft elastic capsules.—One-piece soft elastic capsules for oral use, each containing 200 mg. of benzothiazole are prepared in the usual manner by first dispersing the powdered active material in sufficient corn oil to render the material capsulatable.

(4) Aqueous suspension.—An aqueous suspension for oral use containing in each 5 ml., 1 gram of a benzothiazolyl phenylacetic acid is prepared from the following ingredients:

|  | Gm. |
|---|---|
| 4-(benzothiazol-2-yl)-2-fluorophenylacetic acid | 2000 |
| Methylparaben, U.S.P. | 7.5 |
| Propylparaben, U.S.P. | 2.5 |
| Saccharin sodium | 12.5 |
| Glycerin | 3000 |
| Tragacanth powder | 10 |
| Orange oil flavor | 10 |
| F. D. and C. orange dye | 7.5 |
| Deionized water, q.s. to 10,000 ml. | |

What is claimed is:
1. 4-(benzothiazol-2-yl)-2-fluorophenylacetic acid.
2. 4-(benzothiazol-2-yl)-3-fluorophenylacetic acid.

References Cited

Kiprianov et al.: Zh. Organ. Khim., 1, 757–62 (1965).

RICHARD J. GALLAGHER, Primary Examiner

U.S. Cl. X.R.

260—247.2 R, 293.57, 299, 307, 518, 519; 424—245, 248, 267, 270, 272